United States Patent
Twumasi-Boakye et al.

(10) Patent No.: US 11,650,065 B2
(45) Date of Patent: May 16, 2023

(54) SYSTEMS AND METHODS FOR USING IN-VEHICLE VOCE RECOGNITION, IOT SENSORS AND VEHICLE STATE DATA FOR AUGMENTING CAR-GENERATED GPS/LOCATION-BASED DATA FOR PREDICTING TRAVEL PATTERNS

(71) Applicant: Ford Global Technologies, LLC, Dearborn, MI (US)

(72) Inventors: Richard Twumasi-Boakye, Taylor, MI (US); Girish Yadav, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 17/089,810

(22) Filed: Nov. 5, 2020

(65) Prior Publication Data

US 2022/0136851 A1  May 5, 2022

(51) Int. Cl.
*G01C 21/34* (2006.01)
*B60W 60/00* (2020.01)
(Continued)

(52) U.S. Cl.
CPC ......... *G01C 21/3484* (2013.01); *B60W 40/08* (2013.01); *B60W 60/00253* (2020.02);
(Continued)

(58) Field of Classification Search
CPC .............. G01C 21/3484; B60W 40/08; B60W 60/00253; B60W 2540/01;
(Continued)

(56) References Cited

U.S. PATENT DOCUMENTS 7,082,359 B2   7/2006   Breed
9,200,918 B2  12/2015   Chelotti et al.
(Continued)

FOREIGN PATENT DOCUMENTS

KR        20170025017 A  *  3/2017

OTHER PUBLICATIONS

Lee Hyeon Chae, Translation of KR 20170025017 A, Apparatus And Method For Transmitting Emergency Call, all (Year: 2017).*

(Continued)

*Primary Examiner* — James J Lee
*Assistant Examiner* — Tawri M McAndrews
(74) *Attorney, Agent, or Firm* — Brandon Hicks; Eversheds Sutherland (US) LLP

(57) ABSTRACT

Systems and methods for predicting travel patterns of a vehicle or one or more occupants in the vehicle are provided. A transceiver may receive data indicative of at least one of passenger information, vehicle occupancy, vehicle status, and vehicle location from at least one of a voice recognition device, IoT sensors such as seat sensors, vehicle status sensors, or a GPS system. A processor may determine travel patterns based on the data, predict travel patterns based on the determined travel patterns, and generate a database comprising the predicted travel patterns. In addition, the processor may generate an alert if the determined travel pattern deviates from the predicted travel patterns.

19 Claims, 4 Drawing Sheets

(51) Int. Cl.
*B60W 40/08* (2012.01)
*B60R 25/25* (2013.01)

(52) U.S. Cl.
CPC ........ *B60R 25/257* (2013.01); *B60W 2540/01* (2020.02); *B60W 2540/043* (2020.02); *B60W 2540/21* (2020.02)

(58) Field of Classification Search
CPC ....... B60W 2540/043; B60W 2540/21; B60W 40/10; B60R 25/257
See application file for complete search history.

(56) References Cited

U.S. PATENT DOCUMENTS

| | | | |
|---|---|---|---|
| 10,573,184 | B1* | 2/2020 | Pandit .................... G08G 1/207 |
| 2004/0073361 | A1* | 4/2004 | Tzamaloukas .......... H04W 8/04 |
| | | | 701/414 |
| 2014/0142948 | A1* | 5/2014 | Rathi ...................... G06F 3/167 |
| | | | 704/270.1 |
| 2017/0232915 | A1* | 8/2017 | Dufford ............... G01C 21/343 |
| | | | 701/48 |
| 2018/0231979 | A1 | 8/2018 | Miller et al. |
| 2019/0018411 | A1* | 1/2019 | Herbach ................. B60R 22/48 |
| 2019/0178664 | A1* | 6/2019 | Dudar ................ G06Q 10/0631 |
| 2019/0186939 | A1* | 6/2019 | Cox ........................ G06N 20/00 |
| 2020/0068400 | A1* | 2/2020 | Ramic ................ H04L 63/0853 |

OTHER PUBLICATIONS

Krause et al, "Short-term travel behavior prediction with GPS, land use, and poiny of interest data," IElsevier, Transportation Research Part B, 2018, 13 pages.

* cited by examiner

US 11,650,065 B2

SYSTEMS AND METHODS FOR USING IN-VEHICLE VOCE RECOGNITION, IOT SENSORS AND VEHICLE STATE DATA FOR AUGMENTING CAR-GENERATED GPS/LOCATION-BASED DATA FOR PREDICTING TRAVEL PATTERNS

FIELD OF USE

The present disclosure is directed to systems and methods for using in-vehicle voice recognition technology for enhancing location data to predict and evaluate travel patterns of one or more vehicles or one or more occupants in the one or more vehicles.

BACKGROUND

Travel demand models solely based on household survey data are gradually becoming obsolete due to the proliferation of multiple data sources on vehicle trajectories from GPS and location-based data. Most modeling techniques have begun leveraging these multiple data sources for improving, calibrating, and validating travel demand models.

Exclusively depending on location-based data does not suffice for accurate travel predictions and evaluations due to the lack of depth in rider-specific information. Also, traditional models, which are maintained by model planning organizations, need improvements. Data fusion approaches are being developed to help merge data sources to paint a better mobility picture; however, methods to easily improve the richness of location-based data are yet to be developed.

The lack of depth in GPS/location-based data creates a significant gap in adding to the extent of knowledge and insights about how people move. The resolutions of such data sources, although vast, lack details of in-vehicle occupancy at a specific time, the ages of vehicle occupants and their trip purposes.

Existing location-based traffic "big" data lack inherent details for accurately predicting travel behavior or patterns, especially for non-mandatory trips. Most existing methods try to extend this data sample to the entire population by augmenting with survey data; however, prediction errors are still non-trivial. In-vehicle voice recognition systems are known, but have not been adapted for capturing travel pattern details about vehicle users and occupants.

In view of the foregoing drawbacks of previously known systems and methods, there exists a need for systems and methods for improving use of data sources including location-based data to accurately predict travel behavior or patterns.

DETAILED DESCRIPTION

Overview

Figure 1:
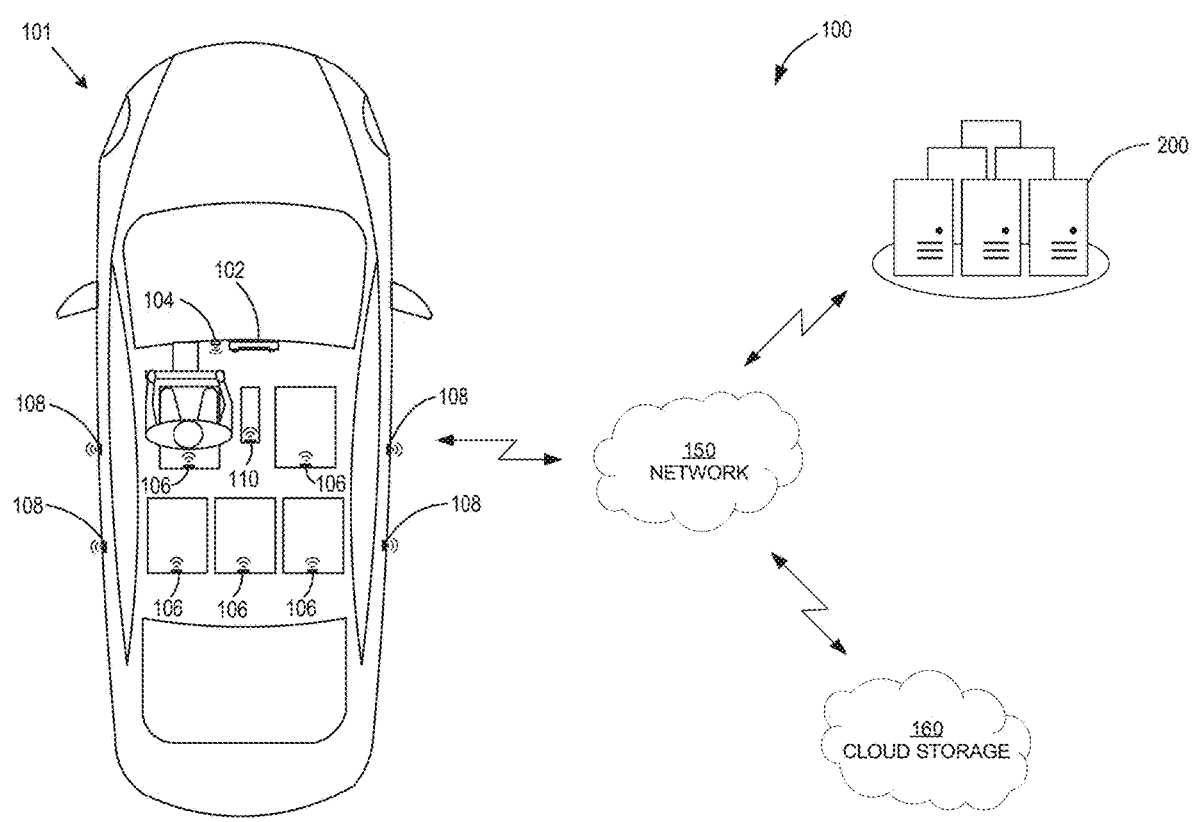
FIG. 1 illustrates a system for predicting travel patterns of a vehicle or one or more occupants in the vehicle in accordance with the principles of the present disclosure.

A smart system that utilizes in-vehicle voice recognition technology, vehicle state data, and internet of things (IoT) sensor information to identify and predict the number of vehicle occupants at a specific time, their age groups, gender, and their trip purposes is disclosed. The process involves synergizing in-vehicle voice recognition occupancy data with vehicle state information, including seat sensors, gear-position, and/or door opening events, for inferring vehicle occupancy changes and trip purpose assignment. For example, the smart system uses voice recognition and vehicle state data to complement car-generated GPS/location-based data to understand travel patterns and present a solution to enrich location-based data traces with vehicle occupants' details. In-voice recognition helps to identify the number of vehicle occupants, their ages, and gender. Additionally, originating locations, e.g., addresses or zip-codes, and vehicle ownership data may provide further information on the socio-economic status of vehicles owners.

The enhanced data set may augment travel behavior models for predicting how people move. For example, the smart system leverages in-vehicle voice recognition to detect and append vehicle occupant characteristics and augments vehicle state data on IoT sensors, e.g., seat sensors, stop location, stop durations, gear-to-park, and door opening events. In addition, the smart system leverages a location awareness module to track land-use characteristics during stop/door opening events and vehicle occupancy to provide insights on trip purpose. Thus, the enhanced data set may augment travel behavior models for predicting how people move. Notably, while survey data captures less than 1% of an entire population, location-based data captures about 30% of trips, and increasing the depth of this dataset will significantly improve our understanding of travel behavior. A more refined comprehension of travel behavior may help agencies to understand infrastructural needs of the public. In addition, the smart system further may inform original equipment manufacturers (OEMs) to enhance vehicle features and routing algorithms. For example, the rich spatial-temporal details on vehicle occupants may provide OEMs with the information to design in-built features in automated vehicles (AVs) for scheduling daily routes for individuals and families using daily diaries.

Accordingly, the smart system may enhance travel demand models by integrating large travel datasets with enhanced data richness into the demand modeling framework for more accurate model calibration, validation, and travel forecasting. The smart system may provide improved business models and use cases for shared fleet deployment based on improved knowledge of real-time travel patterns. In addition, the smart system may include routing scheduling algorithms for AVs, e.g., with the knowledge of user diaries, which may be configured to navigate users to their various destinations. Moreover, in-vehicle reminders may be provided to vehicle users to alert them when they deviate from predicted or usual travel patterns, e.g., when a parent forgets to pick up their children from school.

The present disclosure overcomes the drawbacks of previously-known systems and methods by predicting travel patterns of a vehicle or one or more occupants in the vehicle. For example, the system may include a transceiver for receiving data indicative of at least one of passenger information, vehicle occupancy, vehicle status, and vehicle location, e.g., during predetermined vehicle events, and a memory that stores computer-executable instructions. The system further may include a processor that may access the memory and execute the computer-executable instructions to: determine travel patterns, e.g., passenger pick-up and drop-off, based on the data indicative of passenger information, vehicle occupancy, vehicle status, and vehicle location; predict travel patterns based on the determined travel patterns; and generate a database comprising the predicted travel patterns. The transceiver may receive audio data indicative of passenger information, e.g., an age range and/or gender of one or more passengers and/or an amount of passengers, from a voice recognition device that records and transmits audio data. Accordingly, the processor may extrapolate the passenger information from the audio data.

Additionally, the transceiver may receive data indicative of vehicle occupancy from one or more IoT sensors, e.g., seat sensors, that may detect one or more passengers. Accordingly, the processor may extrapolate an amount of passengers within the vehicle from the data. The transceiver further may receive data indicative of vehicle status from one or more sensors operatively coupled to the vehicle. Accordingly, the processor may extrapolate vehicle status, e.g., motion of the vehicle, whether the vehicle is stopped, the duration of the stop, and/or door status, from the data. In addition, the transceiver may receive data indicative of vehicle location from a GPS system. Accordingly, the processor may extrapolate location type from the data. The processor further may generate an alert if the determined travel pattern deviates from the predicted travel patterns.

In accordance with another aspect of the present disclosure, a method for predicting travel patterns of a vehicle or one or more occupants in the vehicle is provided. The method may include receiving, by a transceiver, data indicative of at least one of passenger information, vehicle occupancy, vehicle status, and vehicle location; determining, by a processor, travel patterns based on the data indicative of passenger information, vehicle occupancy, vehicle status, and vehicle location; predicting, by the processor, travel patterns based on the determined travel patterns; and generating, by the processor, a database comprising the predicted travel patterns. The method further may include generating, by the processor, an alert if the determined travel pattern deviates from the predicted travel patterns.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, predictive travel pattern system 100 is described. System 100 may include vehicle 101 having GPS system 102, voice recognition device 104, and one or more sensors, e.g., IoT sensors 106, door sensors 108, and/or gear sensor 110, all communicatively coupled to predictive travel pattern platform 200 via, e.g., network 150. Predictive travel pattern platform 200 may be located on one or more servers, and communicate with GPS system 102 via network 150 as described in further detail below.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, predictive travel pattern platform 200 may be configured and/or programmed to operate with a vehicle having a Level-4 or Level-5 autonomous vehicle controller.

GPS system 102 is used to plan a navigation route and determine a vehicle's motion, e.g., speed and/or acceleration, and location in real-time, and may be integrated in vehicle 101. GPS system 102 may provide information indicative of location type, e.g., residential area, school, hospital, commercial building, employment zone, etc. This information may be used to help determine the trip purpose after a drop-off as described in further detail below. Additionally or alternatively, GPS system 102 may be embedded in a GPS navigation software application downloadable on, e.g., a smart mobile phone, such as Google Maps, Waze, Apple Maps, etc.

Voice recognition device 104 may be positioned within vehicle 101 and may have a microphone for recording audio within vehicle 101. Voice recognition device 104 may perform voice activity detection, noise estimation, removal techniques, and an optimal filter to generate the audio data. This audio data may be used to identify and segment vehicle occupants at onset of and throughout the trip as described in further detail below.

IoT sensors 106 may be used to detect vehicle occupancy, e.g., the amount of passengers in vehicle 101. For example, IoT sensors 106 may include seat sensors configured to detect the weight of a passenger when the passenger is seated within vehicle 101. Additionally, vehicle 101 may include one or more vehicle state sensors such as door sensors 108 and/or gear sensor 110. Door sensors 108 are configured to detect when a respective car door is open and re-closed, and the duration. Gear sensor 110 may detect when the driver changes gear, e.g., from drive to park, etc. Together, this information may be used to determine, e.g., when a passenger is being picked up or dropped off.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, and/or man-to-machine communication.

Some or all portions of the wireless communication link that supports communications between predictive travel pattern platform 200 and a communication device, such as a router, for example, that may be included in network 150, may be implemented using various types of wireless technologies, such as Bluetooth®, ZigBee®, or near-field-communications (NFC), cellular, Wi-Fi, Wi-Fi direct, machine-to-machine communication, man-to-machine communication, and/or a vehicle-to-everything (V2X) communication.

Information shared between predictive travel pattern platform 200, GPS system 102, voice recognition device 104, IoT sensors 106, door sensors 108, and/or gear sensor 110, may be stored on cloud storage 160 and may be bi-directional in nature. For example, in one case, predictive travel pattern information may be transferred from predictive travel pattern platform 200 to cloud storage 160. Such information stored on cloud storage 160 may be accessed and used by GPS system 102, e.g., various smart vehicles and/or smart mobile devices, or other third parties such as OEMs and/or city planners.

Figure 2:
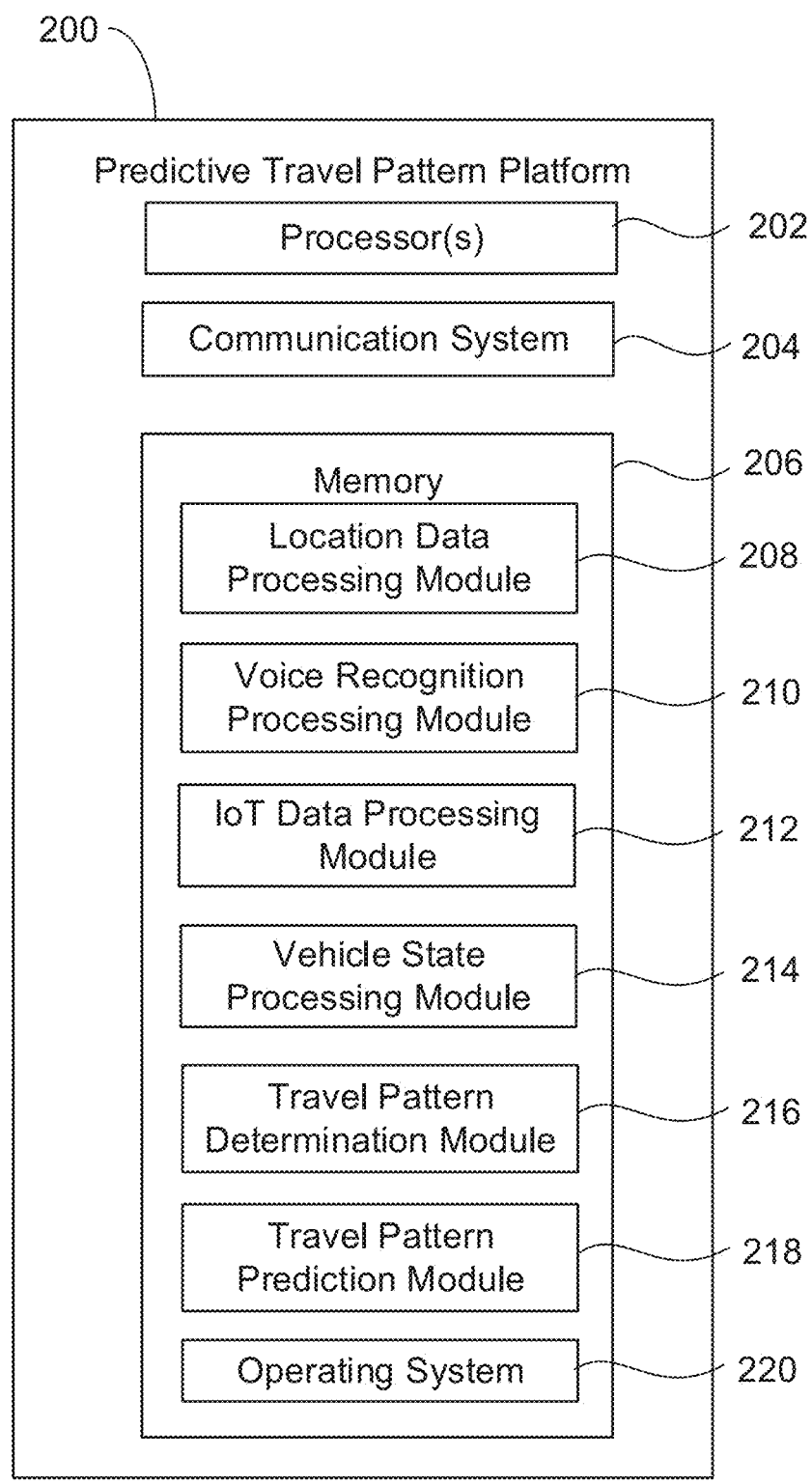
FIG. 2 shows some example components that may be included in a predictive travel pattern platform in accordance with the principles of the present disclosure.

Referring now to FIG. 2, components that may be included in predictive travel pattern platform 200 are described in further detail. Predictive travel pattern platform 200 may include one or more processors 202, communication system 204, and memory 206.

Communication system 204 may include a wireless transceiver that allows predictive travel pattern platform 200 to communicate with GPS system 102, voice recognition device 104, IoT sensors 106, door sensors 108, gear sensor 110, and cloud storage 160. The wireless transceiver may use any of various communication formats, such as, for example, an Internet communications format, or a cellular communications format.

Memory 206, which is one example of a non-transitory computer-readable medium, may be used to store operating system (OS) 220, location data processing module 208, voice recognition data processing module 210, IoT data processing module 212, vehicle state data processing module 214, travel pattern determination module 216, and travel pattern prediction module 218. The modules are provided in the form of computer-executable instructions that may be executed by processor 202 for performing various operations in accordance with the disclosure.

Memory 206 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Location data processing module 208 may be executed by processor 202 for receiving and processing location-based data from GPS system 102. For example, at each concurrent stop and door opening event, location data processing module 208 may use GPS information to determine land-use characteristics such as, shopping mall locations, employment zones, schools, etc. of the vehicle in real-time.

Voice recognition data processing module 210 may be executed by processor 202 for receiving audio data from voice recognition device 104, and identifying and segmenting vehicle occupants at the onset of and throughout the trip, e.g., at predetermined vehicle events, based on the audio data. Predetermined vehicle events may include, for example, when the vehicle is stopped for more than a predetermined duration and/or when the door is open. Voice recognition data processing module 210 uses voice activity detection, noise estimation, removal techniques and an optimal filter. Voice recognition data processing module 210 may first determine and segment the number of occupants based on the audio data, and append this information to the location-based data received from location data processing module 208 in real-time. After each long stop, e.g., when the vehicle is stopped for more than a predetermined duration, voice recognition data processing module 210 may use machine learning to identify the number and ages of vehicle occupants to identify whether an occupant was picked up or dropped off. Voice recognition data processing module 210 may continuously classify the number of occupants by age and gender and append this information to location-based data in real-time, e.g., during predetermined vehicle events.

IoT data processing module 212 may be executed by processor 202 for receiving data indicative of vehicle occupancy from IoT sensors 106, such that IoT data processing module 212 may determine how many occupants are in the vehicle. Accordingly, IoT data processing module 212 may corroborate the number of occupants determined by voice recognition data processing module 210 based on the audio data received from voice recognition device 104.

Vehicle state data processing module 214 may be executed by processor 202 for receiving data indicative of vehicle status from the vehicle status sensors, e.g., door sensors 108 and/or gear sensor 110. Vehicle state data processing module 214 may determine when the vehicle is stopped, e.g., because the vehicle's speed is zero, the gear shaft was moved from drive to park, and/or a door is detected to be open. In addition, vehicle state data processing module 214 may record the duration of the stop.

Travel pattern determination module 216 may be executed by processor 202 for determining travel patterns based on the information generated by location data processing module 208, voice recognition data processing module 210, IoT data processing module 212, vehicle state data processing module 214 described above. For example, based on the generated information, travel pattern determination module 216 may assign a trip purpose for a particular trip, e.g., dropping off children at school, going to the grocery store, driving to work, etc.

Travel pattern prediction module 218 may be executed by processor 202 for using machine learning to predict travel patterns based on the travel patterns determined by travel pattern determination module 216. For example, when a trip is designated as "dropping off children at school" by travel pattern determination module 216 because two children were determined to be in the car by voice recognition data processing module 210 and IoT data processing module 212, and the children were determined to be dropped off at a school by location data processing module 208 and vehicle state data processing module 214, travel pattern prediction module 218 may predict that, at the onset of the trip, if two children enter the vehicle, the trip purpose will be to drop the children off at school. This prediction may further be augmented with information regarding the navigation route of the vehicle provided by GPS system 102, e.g., the vehicle is taking the usual route to the school. Moreover, travel pattern prediction module 218 may be executed by processor 202 for generating an alert if the determined travel pattern in real-time deviates from the predicted travel pattern, e.g., if the vehicle does not drop off the children at school as predicted.

Figure 3:
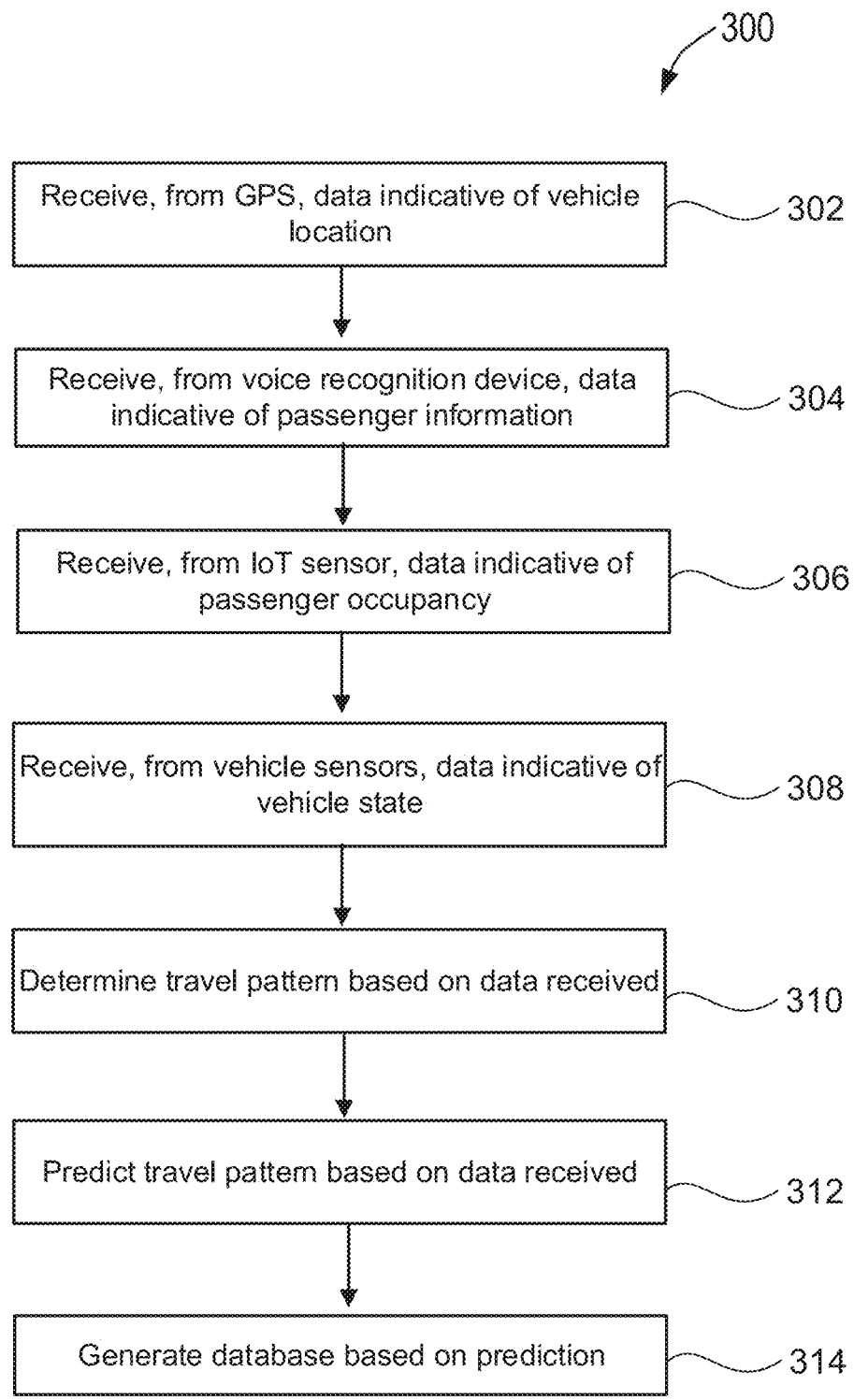
FIG. 3 is a flow chart illustrating exemplary steps for predicting travel patterns of a vehicle or one or more occupants in the vehicle in accordance with the principles of the present disclosure.

Referring now to FIG. 3, exemplary method 300 for predicting travel patterns of a vehicle or one or more occupants in the vehicle is described. At step 302, predictive travel pattern platform 200 may receive, from GPS system 102, data indicative of vehicle location of vehicle 101. Based on this information, predictive travel pattern platform 200 may determine the vehicle's location as well as the type of location in real-time. At step 304, predictive travel pattern platform 200 may receive, from voice recognition device 104, audio data indicative of passenger information, e.g., an age range, gender, and/or amount of passengers within vehicle 101. Accordingly, predictive travel pattern platform 200 may determine the amount of occupants in the vehicle, as well as their respective ages and gender based on the audio data.

At step 306, predictive travel pattern platform 200 may receive, from IoT sensors 106, data indicative of vehicle occupancy of vehicle 101. This information may be used to corroborate or supplement the vehicle occupancy information determined by predictive travel pattern platform 200 at step 304. At step 308, predictive travel pattern platform 200 may receive, from the vehicle status sensors, e.g., door sensors 108 and/or gear sensor 110, data indicative of the vehicle status, e.g., whether the vehicle is stopped.

At step 310, predictive travel pattern platform 200 may determine a travel pattern, e.g., assign a trip purpose to a trip, based on the information received at steps 302-308. At step 312, predictive travel pattern platform 200 may use machine learning to predict travel patterns based on the determined travel patterns. Accordingly, if a travel pattern determined in real-time for a current trip deviates from a predict travel pattern, predictive travel pattern platform 200 may generate and transmit an alert to the driver. At step 314, the predicted travel patterns may be compiled into a database, e.g., on a cloud server, for access by, e.g., predictive travel pattern platform 200, vehicle 101, OEMs, etc.

Figure 4:
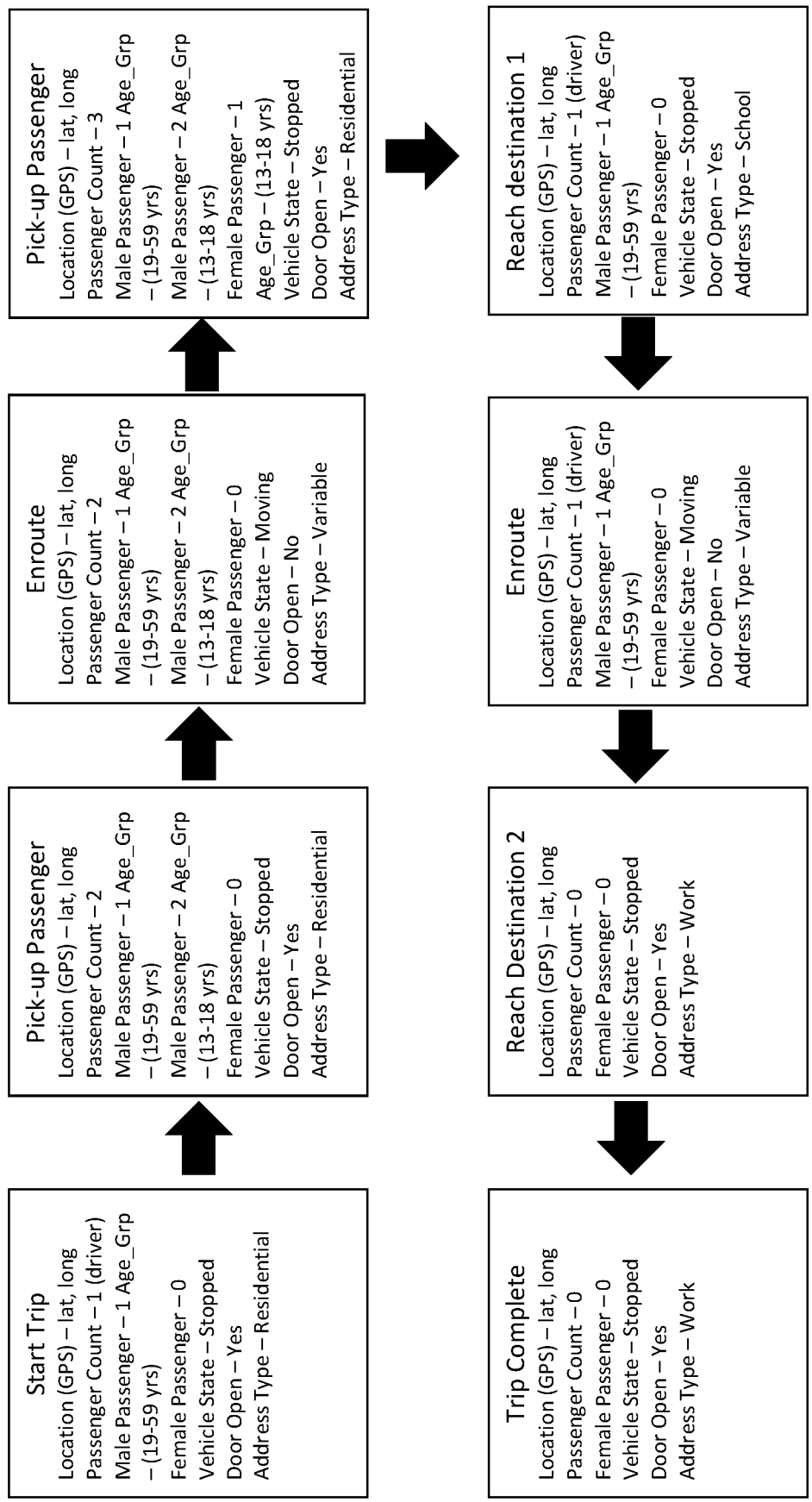
FIG. 4 shows an illustrative travel pattern determination in accordance with the principles of the present disclosure.

Referring now to FIG. 4, an illustrative travel pattern determination is described. As shown in FIG. 4, at the start of the trip, GPS system 102 provides the location, e.g., longitude/latitude coordinates, of the vehicle, as well as the type of location, e.g., residential area, voice recognition device 104 and/or IoT sensors 106 determines that there is one occupant in the vehicle, e.g., the driver, voice recognition device 104 determines that the occupant is a male in the age range of 19-59 years old, and the vehicle status sensors determine that the vehicle is stopped and the door is open. Next, voice recognition device 104 and/or IoT sensors 106 determines that there are two occupants in the vehicle, e.g., the same male occupant as before and an additional passenger, voice recognition device 104 determines that the second occupant is a male in the age range of 13-18 years old, and the vehicle status sensors determine that the vehicle is stopped and the door is open. Thus, predictive travel pattern platform 200 determines that a passenger is being picked up.

Next, GPS system 102 provides information that the location of the vehicle is changing and the vehicle status sensors determines that the vehicle is moving. Thus, predictive travel pattern platform 200 determines that the vehicle is en route. Next, GPS system 102 provides the location, e.g., longitude/latitude coordinates, of the vehicle, as well as the type of location, e.g., residential area, voice recognition device 104 and/or IoT sensors 106 determines that there are three occupants in the vehicle, e.g., the same two male occupants as before and an additional passenger, voice recognition device 104 determines that the third occupant is a female in the age range of 13-18 years old, and the vehicle status sensors determine that the vehicle is stopped and the door is open. Thus, predictive travel pattern platform 200 determines that another passenger is being picked up. Next, predictive travel pattern platform 200 determines that the vehicle is again en route (not shown). Next, GPS system 102 provides the location, e.g., longitude/latitude coordinates, of the vehicle, as well as the type of location, e.g., school, voice recognition device 104 and/or IoT sensors 106 determines that there is only one occupant in the vehicle, voice recognition device 104 determines that occupant is the initial male driver in the age range of 19-59 years old, and the vehicle status sensors determine that the vehicle is stopped and the door is open. Thus, predictive travel pattern platform 200 determines that the two passengers are being dropped off at school.

Next, GPS system 102 provides information that the location of the vehicle is changing and the vehicle status sensors determine that the vehicle is moving. Thus, predictive travel pattern platform 200 determines that the vehicle is again en route. Next, GPS system 102 provides the location, e.g., longitude/latitude coordinates, of the vehicle, as well as the type of location, e.g., work, voice recognition device 104 and/or IoT sensors 106 determines that there no occupants in the vehicle, and the vehicle status sensors determine that the vehicle is stopped and the door is open. Thus, predictive travel pattern platform 200 determines that the driver has reached the second destination, e.g., work, and the trip is complete. Predictive travel pattern platform 200 may then predict this travel pattern the next time that a trip begins with the same determined pattern in real-time, e.g., picking up a male and female passenger within the ages of 13-18 on a weekday in the morning. Thus, if after the vehicle picks up the female passenger, predictive travel pattern platform 200 determines that the vehicle is not driving toward the school as provided by GPS system 102, predictive travel pattern platform 200 may generate and transmit an alert to the driver of the vehicle that the driver forgot to drop the passengers off at school.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. For example, the present disclosure is not limited to an intelligent survey mechanism methodology or the research component of developing travel demand models. The embodiments described herein may be extended to vehicle manufacturing given insights gained on vehicle users over time. It will be apparent to persons skilled in the relevant art that various changes in form and detail can be made therein without departing from the spirit and scope of the present disclosure. For example, the predictive travel pattern platform described herein may be disposed in or otherwise integrated with other components described herein such as the cameras, the cloud network, and/or the GPS system. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for predicting travel patterns of a vehicle or one or more occupants in the vehicle, the system comprising:
a transceiver configured to receive data indicative of passenger information, vehicle occupancy, vehicle status, and vehicle location, wherein the data comprises audio data from a voice recognition device configured to record and transmit audio data, and wherein the processor is configured to extrapolate passenger information from the audio data such as an age range and a gender of the one or more occupants in the vehicle, the voice recognition device comprising a removal technique and an optimal filter noise estimation;
a memory that stores computer-executable instructions; and a processor configured to access the memory and execute the computer-executable instructions to:
determine travel patterns based on the data indicative of passenger information, vehicle occupancy, vehicle status, vehicle location, and the age range and the gender of the one or more occupants in the vehicle, wherein the determined travel patterns are comprised of two or more stops, and wherein the passenger information, vehicle occupancy, vehicle status, vehicle location, and the age range and the gender of the one or more occupants in the vehicle changes at each of the two or more stops;
predict travel patterns based on the determined travel patterns;
generate a database comprising the predicted travel patterns; and
generate and transmit an alert to a driver of the vehicle when the determined travel pattern deviates from the predicted travel patterns.

2. The system of claim 1, wherein the processor is configured to extrapolate passenger information comprising an amount of passengers within the vehicle from the audio data.

3. The system of claim 1, wherein the transceiver is configured to receive data indicative of vehicle occupancy from one or more IoT sensors configured to detect one or more passengers, and wherein the processor is configured to extrapolate an amount of passengers within the vehicle from the data.

4. The system of claim 3, wherein the one or more IoT sensors comprises one or more seat sensors configured to detect the one or more passengers.

5. The system of claim 1, wherein the transceiver is configured to receive data indicative of vehicle status from one or more sensors operatively coupled to the vehicle, and wherein the processor is configured to extrapolate vehicle status from the data.

6. The system of claim 5, wherein the processor is configured to extrapolate vehicle status comprising door status from the data.

7. The system of claim 5, wherein the processor is configured to extrapolate vehicle status comprising motion of the vehicle from the data.

8. The system of claim 7, wherein the vehicle status indicates that the vehicle is stopped.

9. The system of claim 8, wherein the processor is configured to extrapolate vehicle status comprising duration of the stop from the data.

10. The system of claim 1, wherein the transceiver is configured to receive data indicative of vehicle location from a GPS system, and wherein the processor is configured to extrapolate location type from the data.

11. The system of claim 1, wherein the transceiver is configured to receive data indicative of at least one of passenger information, vehicle occupancy, vehicle status, and vehicle location during predetermined vehicle events.

12. The system of claim 1, wherein the determined travel patterns comprise passenger pick-up and drop-off.

13. The system of claim 1, wherein the processor is configured to divide the determined travel patterns into two or more segments where a first segment occurs before a first stop of the two or more stops and where a second segment occurs after a first stop and before a second stop of the two or more stops.

14. The system of claim 13, wherein the processor is configured to assign, to each of the one or more occupants, at least one of the two or more segments based on which of the two or more segments each of the one or more occupants are present in the vehicle for, the assigned one or more segments being a determined occupant travel pattern used to predict an occupant travel pattern.

15. A method for predicting travel patterns of a vehicle or one or more occupants in the vehicle, the method comprising:
receiving data indicative of passenger information, vehicle occupancy, vehicle status, and vehicle location, wherein the data comprises audio data from a voice recognition device configured to record and transmit audio data, and wherein the processor is configured to extrapolate passenger information from the audio data such as an age range and a gender of the one or more occupants in the vehicle, the voice recognition device comprising a removal technique and an optimal filter noise estimation;
determining travel patterns based on the data indicative of passenger information, vehicle occupancy, vehicle status, vehicle location, and the age range and the gender of the one or more occupants in the vehicle, wherein the determined travel patterns are comprised of two or more stops, and wherein the passenger information, vehicle occupancy, vehicle status, vehicle location, and the age range and the gender of the one or more occupants in the vehicle changes at each of the two or more stops;
predicting travel patterns based on the determined travel patterns;
generating a database comprising the predicted travel patterns; and
generating and transmitting an alert to a driver of the vehicle when the determined travel pattern deviates from the predicted travel patterns.

16. The method of claim 15, wherein receiving data indicative of vehicle location comprises receiving data indicative of vehicle location from a GPS system, the method further comprising extrapolating location type from the data.

17. The method of claim 15, further comprising generating an alert based on the determined travel pattern deviating from the predicted travel patterns.

18. The method of claim 15, further comprising dividing the determined travel patterns into two or more segments where a first segment occurs before a first stop of the two or more stops and where a second segment occurs after a first stop and before a second stop of the two or more stops.

19. The method of claim 18, further comprising assigning, to each of the one or more occupants, at least one of the two or more segments based on which of the two or more segments each of the one or more occupants are present in the vehicle for, the assigned one or more segments being a determined occupant travel pattern used to predict an occupant travel pattern.

\* \* \* \* \*